(12) United States Patent
Schnatterer et al.

(10) Patent No.: US 12,485,504 B2
(45) Date of Patent: Dec. 2, 2025

(54) METHOD FOR PRODUCING A FRICTION BRAKE BODY

(71) Applicants: Robert Bosch GmbH, Stuttgart (DE); Breyden GmbH, Breidenbach (DE)

(72) Inventors: Christian Schnatterer, Oberursel (DE); Kangjian Wu, Marburg (DE); Ilja Potapenko, Biedenkopf (DE)

(73) Assignees: Robert Bosch GmbH, Stuttgart (DE); Breyden GmbH, Breidenbach (DE)

( * ) Notice: Subject to any disclaimer, the term of this patent is extended or adjusted under 35 U.S.C. 154(b) by 105 days.

(21) Appl. No.: 18/001,230

(22) PCT Filed: Jun. 10, 2021

(86) PCT No.: PCT/EP2021/065553
§ 371 (c)(1),
(2) Date: Dec. 8, 2022

(87) PCT Pub. No.: WO2021/254858
PCT Pub. Date: Dec. 23, 2021

(65) Prior Publication Data
US 2023/0234168 A1 Jul. 27, 2023

(30) Foreign Application Priority Data
Jun. 15, 2020 (DE) .............. 10 2020 207 360.0

(51) Int. Cl.
*B23K 26/144* (2014.01)
*B23K 26/14* (2014.01)
(Continued)

(52) U.S. Cl.
CPC .......... *B23K 26/342* (2015.10); *B23K 26/144* (2015.10); *B23K 26/1464* (2013.01);
(Continued)

(58) Field of Classification Search
None
See application file for complete search history.

(56) References Cited

U.S. PATENT DOCUMENTS

2016/0223041 A1* 8/2016 Saga ................. B23K 26/1476
2016/0288264 A1 10/2016 Jones et al.
(Continued)

FOREIGN PATENT DOCUMENTS

| CN | 102554471 A | 7/2012 |
| CN | 104178763 A * | 12/2014 |

(Continued)

OTHER PUBLICATIONS

International Search Report corresponding to PCT Application No. PCT/EP2021/065553, mailed Sep. 10, 2021 (German and English language document) (5 pages).

*Primary Examiner* — David P Turocy
(74) *Attorney, Agent, or Firm* — Maginot, Moore & Beck

(57) ABSTRACT

A method is disclosed for producing a friction brake body, in particular a brake disc, which has a main part with a frictional contact region. A wear protection layer is produced on the frictional contact region by way of laser cladding using a laser beam oriented towards the frictional contact region. The wear protection layer is produced by at least one pulverulent additive during the laser cladding. At least two pulverulent additives are added simultaneously such that the dwell time thereof in the laser beam differs.

10 Claims, 3 Drawing Sheets

(51) Int. Cl.
  *B23K 26/342* (2014.01)
  *C23C 24/08* (2006.01)
  *B23K 103/02* (2006.01)
  *F16D 65/02* (2006.01)
  *F16D 65/12* (2006.01)

(52) U.S. Cl.
  CPC ........ *C23C 24/085* (2013.01); *B23K 2103/02* (2018.08); *F16D 65/127* (2013.01); *F16D 2065/132* (2013.01); *F16D 2250/0046* (2013.01); *F16D 2250/0092* (2013.01)

(56) References Cited

U.S. PATENT DOCUMENTS

| | | | |
|---|---|---|---|
| 2017/0050268 A1* | 2/2017 | Fujiya | B23K 26/342 |
| 2017/0287685 A1 | 10/2017 | Ferrasse et al. | |
| 2020/0072307 A1* | 3/2020 | Rettig | C23C 28/021 |

FOREIGN PATENT DOCUMENTS

| | | | | | |
|---|---|---|---|---|---|
| CN | 105734560 A | * | 7/2016 | ........... | C23C 24/103 |
| CN | 105755464 B | * | 4/2018 | ........... | C23C 24/103 |
| CN | 110592585 A | * | 12/2019 | ........... | C23C 24/103 |
| DE | 10 2018 130 798 A1 | | 6/2020 | | |
| EP | 3 034 902 A1 | | 6/2016 | | |
| EP | 3 620 546 A2 | | 3/2020 | | |
| JP | H11181563 A | * | 7/1999 | | |
| JP | 2011088154 A | * | 5/2011 | ......... | B23K 35/0244 |
| WO | 2016/151781 A1 | | 9/2016 | | |
| WO | WO-2024132040 A1 | * | 6/2024 | ........... | B23K 26/144 |

\* cited by examiner

METHOD FOR PRODUCING A FRICTION BRAKE BODY

This application is a 35 U.S.C. § 371 National Stage Application of PCT/EP2021/065553, filed on Jun. 10, 2021, which claims the benefit of priority to Serial No. DE 10 2020 207 360.0, filed on Jun. 15, 2020 in Germany, the disclosures of which are incorporated herein by reference in their entirety.

The disclosure relates to a method and a device for producing a friction brake body, in particular a brake disk, which has a base body with a frictional contact region, wherein a wear protection layer is produced on the frictional contact region by means of laser cladding using a laser beam directed onto the frictional contact region, wherein the wear protection layer is produced with at least one powdered additive during laser cladding.

BACKGROUND

Method for producing friction brake bodies of the type mentioned above are already known from the prior art. In order to reduce the wear occurring due to friction during operation, it is known to provide the friction brake body with a wear protection layer which is wear-resistant and ensures a long service life of the friction brake body. Laser cladding has already been proven to be advantageous for producing the wear protection layer. In this case, the surface of the base body to be coated is melted locally by means of a laser beam, and a powdered additive is added. Before reaching the molten surface, the additive is at least partially liquefied or completely melted by the laser beam so that a substance-to-substance bond between the molten surface and the additive is produced. In comparison to thermally sprayed layers, layers applied by laser cladding normally have a higher layer adhesion and better delamination resistance as a result of the substance-to-substance bond. A corresponding production method which provides laser cladding is already known from published patent application EP 3 034 902 A1, for example.

SUMMARY

The method according to the disclosure has the advantage that, in the combination of at least two different powdered additives, the additives are not fed as a mixture but separately to the laser cladding process and are melted individually by the laser beam in order to ensure optimal joining in the wear protection layer. According to the disclosure, it is provided for this purpose that at least two powdered additives are simultaneously added such that their dwell times in the laser beam are of different lengths. It is thereby achieved that the different additives are influenced differently by the laser beam in order to ensure, for example, that both additives are completely melted by the laser beam or are selectively melted to different degrees.

Preferably, each of the additives is blown by at least one nozzle each onto the base body such that it enters the laser beam before reaching the base body. Since the additives are blown onto the base body by one nozzle each, a targeted orientation of an additive beam is possible, which cost-effectively enables the targeted reaching and use of the laser beam.

Particularly preferably, the at least two additives are blown into the laser beam at different angles relative to the laser beam. Given the different blow-in angles, the additives dwell in the laser beam for different lengths of time until they reach the base body. For example, if the angle to the laser beam is selected to be greater, the dwell time is shorter in comparison to a small angle. As a result, the dwell time in the laser beam can easily be optimally adapted to the particular additive as a function of the set angle.

Preferably, the at least two additives are blown in at equal or different radial distances from the laser beam at equal or different axial heights relative to the laser beam. The dwell time of the particular additive in the laser beam can also be advantageously adapted by the radial or lateral distance of the nozzles from the laser beam and the axial distance from the base body (which corresponds to the axial height or a distance in the orientation of the laser beam).

Furthermore, it is preferably provided that the angles are selected such that the particular additive is melted by the laser beam, in particular is melted as completely as possible or as incompletely as possible. The complete melting in particular ensures the advantageous substance-to-substance bond of the particular additive with the molten region of the base body, in particular with a molten iron-based alloy on the base body. As a result of the incomplete melting, an undesired, excessively high degree of melting or dissociation of the particular additive can be avoided.

Furthermore, it is preferably provided that the particular additive is blown into the laser beam from at least two nozzles in two material jets so that the material jets of the particular additive meet in the laser beam. Blowing in from two sides allows the material jets which meet in the laser beam to be advantageously mixed with one another and/or distributed uniformly in the molten surface of the base body. Laterally injecting an additive from two sides thus results in a meeting point, in particular within the laser beam, at which the two material jets meet and mix with one another. The blow-in angles of the two material jets are then preferably selected to be equal in order to ensure a uniform distribution. If the material jets differ due to different material densities and/or volume flows, differing blow-in angles may be advantageous.

Preferably, the material jets of the particular additive are blown in from the at least two nozzles in a manner diametrically opposite relative to the laser beam, or evenly distributed over the circumference of the laser beam.

Furthermore, it is preferably provided that the material jets of the at least two additives meet at a meeting point in the laser beam. Thus, all material jets which are used in the present laser cladding meet at one location in the laser beam and are advantageously mixed with one another. Due to the different blow-in angles or the different radial distances from the laser beam, the material jets already dwell in the laser beam for different lengths of time before reaching the meeting point and, as a result, are treated for different lengths of time by the laser beam.

According to a preferred development of the disclosure, the material jets of a first additive meet at a first meeting point in the laser beam, and the material jets of a second additive meet at a second meeting point in the course of the laser beam, wherein the two meeting points are spaced apart from one another in the beam direction of the laser beam. This also further influences the dwell time of the additives in the laser beam. The second meeting point is in particular located in the laser beam before reaching the base body, or alternatively in the base body; the second meeting point is therefore only an imaginary meeting point.

According to a preferred development of the disclosure, two groups, namely alloys, in particular iron-based alloys, and hard materials which may be compounds of largely one type such as carbides, nitrides or borides, are added as additives. This results in advantageous properties of the wear protection layer with respect to corrosion resistance and wear resistance.

The device according to the disclosure has at least two nozzles for blowing in material streams with different additives into the laser beam of a laser beam source, wherein the nozzles are oriented such that the material streams can be blown into the laser beam at different angles. This results in the advantages already mentioned. Further advantages and preferred features and combinations of features result in particular from the previously described features and from the claims.

BRIEF DESCRIPTION OF THE DRAWINGS

The disclosure is explained in more detail below with reference to the drawings.

DETAILED DESCRIPTION

Figure 1:
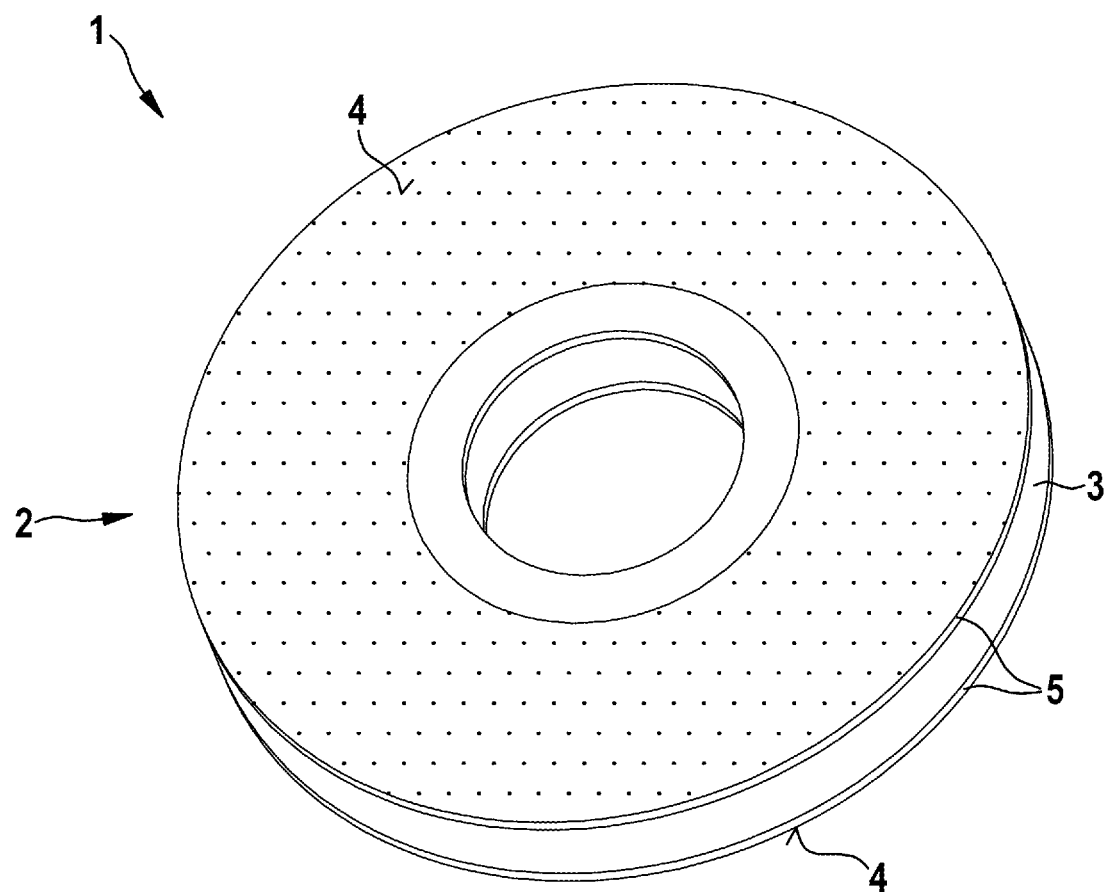
FIG. 1 shows an advantageous friction brake body in a simplified perspective illustration.

FIG. 1 shows a simplified perspective illustration of a friction brake body, designed as a brake disk 1, of a friction brake 2 (not shown in greater detail here) of a motor vehicle. The brake disk 1 is designed in the shape of a circular ring and serves to work together with a movable brake pad of the friction brake 2, which brake pad can be pressed against at least one of the end faces of the brake disk 1. An optionally present brake disk pot is not shown in FIG. 1.

The brake disk 1 has a base body 3 which is designed in the shape of a circular ring and, on both of its faces, has a frictional contact surface 4 in each case which serves to work together with the brake pad of the friction brake 2. The base body 3 is preferably made of gray cast iron. The friction contact surfaces 4 are preferably formed by a wear protection layer 5 formed on the base body 3.

Figure 2:
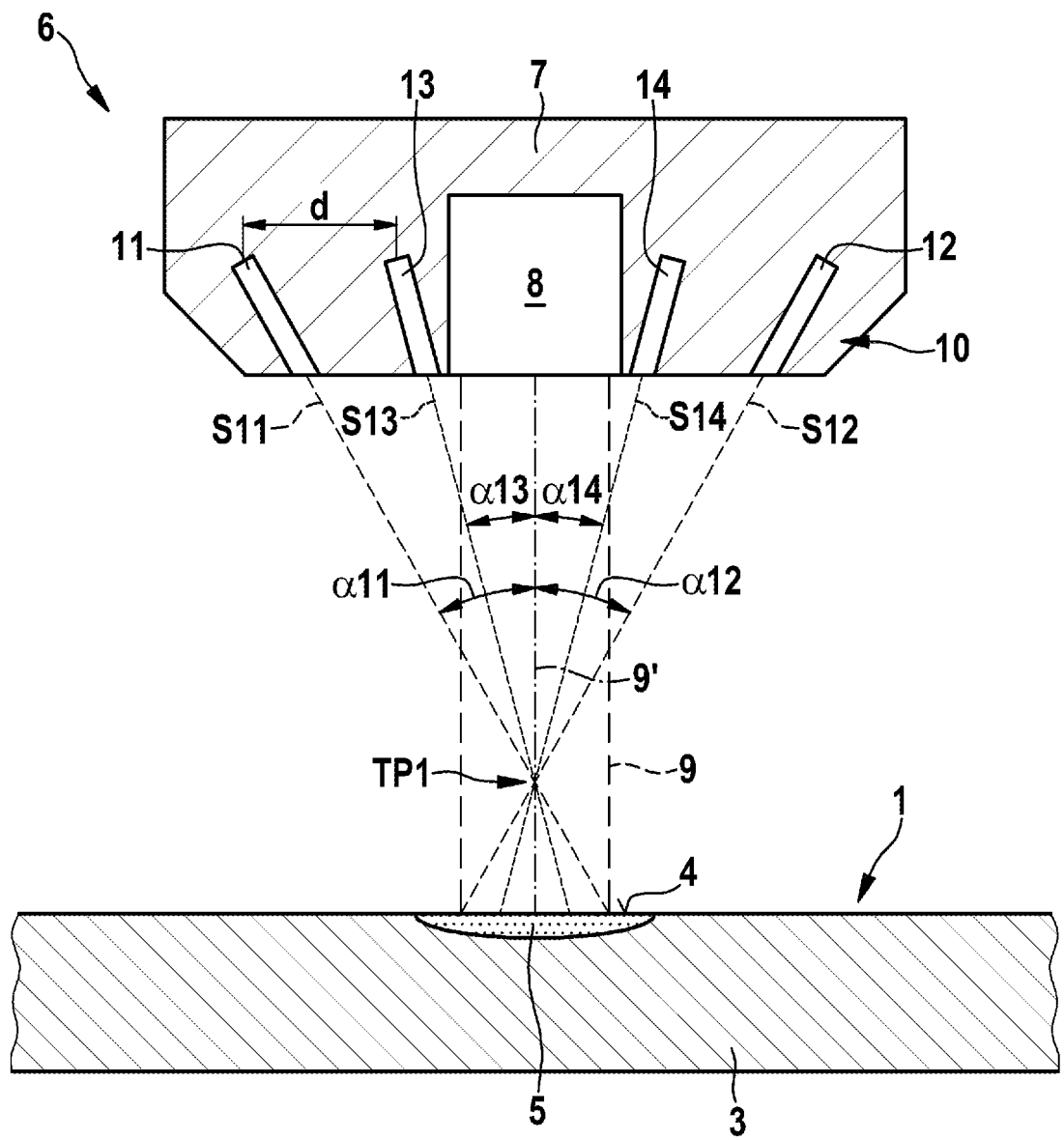
FIGS. 2 and 3 show advantageous exemplary embodiments of a device and of a method for producing the friction brake body.

According to the present exemplary embodiment, the wear protection layer 5 is produced by laser cladding. FIG. 2 shows, in a simplified illustration, an advantageous device 6 for carrying out the laser cladding method. The device 6 has a working head 7 which bears a laser beam source 8 for generating a laser beam 9, and a unit 10 for blowing out different powdered additives.

The unit 10 has, by way of example, a plurality of nozzles 11, 12, 13 and 14 which are held on the working head 7. In this case, the nozzle pairs 13 and 14 or 11 and 12 are arranged rotationally symmetrically around the laser beam and are only shown as a pair for illustrative reasons. In particular, at least three nozzles are advantageous for each rotational symmetry. When three nozzles are used, they are arranged offset at an angle of 120°; when four nozzles are used, an angular offset of 90° is preferred.

When distributing the nozzles 11 to 14, the rotational symmetry along the laser beam 9 is to be maximized. When 2×3 nozzles are used, the nozzles are alternately offset by 60°.

As an alternative to discrete nozzles (injectors), annular gap nozzles may be used which enable continuous conveying (analogous to the lateral surface of a pyramid that has a round base area and stands on the tip). The nozzles 11 to 14 are oriented at a particular angle to the laser beam 9 so that a material jet S11 to S14 leaving the respective nozzle 11 to 14 is oriented at a predetermined angle $\alpha 11$, $\alpha 12$, or $\alpha 13$ and $\alpha 14$, to the laser beam 9 or its central longitudinal axis 9'.

The nozzles 11, 12 serve to blow out a first additive. The nozzles 13 and 14 serve to blow out a second additive. As shown in FIG. 2, the additives are blown into the laser beam 9 at the predetermined angles $\alpha 11$ to $\alpha 14$. The blow-in angles of the nozzles 11 and 12 correspond to one another and differ from the blow-in angles $\alpha 13$ and $\alpha 14$ of the nozzles 13 and 14, which are likewise equal ($\alpha 11 = \alpha 12 \neq \alpha 13 = \alpha 14$). The nozzles 11 and 12 are arranged on different sides or diametrically opposite one another on the working head 7, as are the nozzles 13 and 14 with respect to one another. As a result, the material jets S11, S12, S13, S14 of the nozzles 11, 12, 13, 14 meet in the laser beam 9 at a meeting point TP1. The nozzles 11, 12 are arranged at a further radial distance from the laser beam or the laser beam source 8 on the working head 7 than are the nozzles 13, 14. Due to the different blow-in angles $\alpha 11$, $\alpha 12$ on the one hand and $\alpha 13$, $\alpha 14$ on the other hand, it is ensured that the material jets S11 to S14 nevertheless meet at the meeting point TP1 within the laser beam 9 at an axial distance from the base body 3.

Due to the advantageous arrangement and orientation of the nozzles 11 to 14, it is achieved that the two additives dwell in the laser beam 9 for different lengths of time. Due to the smaller angle $\alpha 13$, $\alpha 14$ and due to the lateral distance from the laser beam source 8, it is achieved that the second additive blown out by the nozzles 13, 14 dwells longer in the laser beam 9 than does the first additive blown out by the nozzles 11, 12. The meeting point TP1 is selected such that the material jets S11 to S14 meet on the base body 3 within the laser beam 9 so that the additives are melted, and an advantageous substance-to-substance bond of the blown in additives to the melted region of the base body 3 is ensured. As a first additive in the present case, an additive is thus used which requires a shorter dwell time in the laser beam in order to be melted in comparison to the second additive. Conversely, the principle can also be used if, for example, an additive is not to melt. When processing an iron-based alloy with chromium carbide, for example, the iron-based alloy is to melt completely, while it is advantageous for chromium carbide if the degree of melting is as low as possible. In this case, chromium carbide is preferably blown in such that the interaction time (dwell time) with the laser beam 9 is as short as possible.

Figure 3:
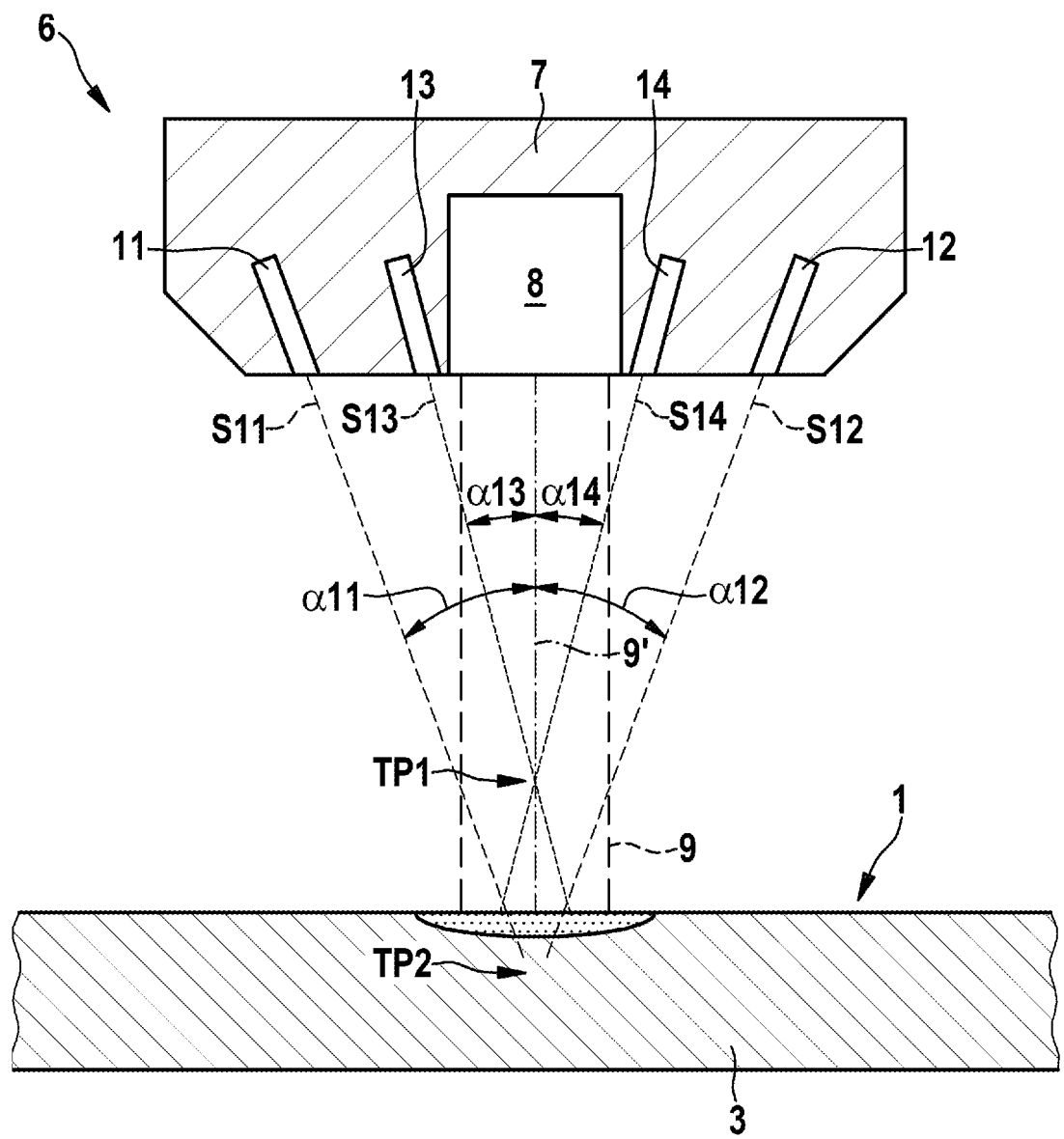

In the event that particularly high thermophysical differences of the additives exist, a separate meeting point is respectively set for the two additives by means of the blow-in angle and the blow-in position of the nozzles 11 to 14. In this respect, FIG. 3 shows a further exemplary embodiment in a simplified illustration, wherein identical elements are provided with identical reference signs, and reference is made in this respect to the above description. Below, basically only the differences will be discussed.

As in the preceding exemplary embodiment, the material jets S13 and S14 meet in the aforementioned meeting point TP1 at a distance from the base body 3. In contrast, the material jets S11 and S12 meet at a second meeting point TP2 which is located at an axial distance, or a distance in the beam direction of the laser beam 9, from the meeting point TP1. In the present case, the meeting point TP2 is located in the beam direction of the laser beam 9 but within the base body 3. For this purpose, the blow-in angles $\alpha 11$ and $\alpha 12$ are selected to be smaller than in the preceding exemplary embodiment. This allows the second additive to have a significantly longer dwell time in the laser beam 9 than the first additive which is blown out by the nozzles 11 and 12.

According to a further exemplary embodiment, the wear protection layer has niobium carbide (NbC) and stainless steel (e.g., a Cr or CrNi steel). Due to the higher thermal stability of NbC compared to stainless steel, a longer interaction time with the laser is to be sought for NbC. By adapting the dwell time of niobium carbide and stainless steel above the base body 3 in the laser beam 9, effective melting of the two additives up to complete melting is ensured. The molten portion of the niobium carbide is finely distributed as NbC in the stainless steel matrix during solidification, and thus causes a homogeneous hardness distribution within the coating. In addition, the melting of the surface of the remaining portion of the carbides enables a substance-to-substance bond between matrix and hard materials, whereby the hard materials or carbides can be prevented from detaching during thermomechanical stress on the friction brake body. Thus, according to the present exemplary embodiment, it is provided that niobium carbide is used as the second additive and is subjected to a longer dwell time in the laser beam 9 until complete melting.

According to a further exemplary embodiment, the wear protection layer is formed from silicon carbide and stainless steel. Due to the high thermal conductivity of the silicon carbide, advantageous heat conduction from the wear protection layer into the base body is ensured, whereby the thermal strength of the friction brake body is increased. By adapting the meeting point TP2 for the silicon carbide used as the first additive according to FIG. 3, the thermal energy fed into the silicon carbide during laser cladding is reduced, whereby dissociation of SiC is reduced, and formation of undesired Fe—Si compounds in the wear protection layer 5 is largely prevented so that, in particular, embrittlement of the wear protection layer 5 is prevented.

The invention claimed is:

1. A method for producing a friction brake body which has a base body with a frictional contact region, comprising:
   producing a wear protection layer on the frictional contact region by way of laser cladding using a laser beam directed onto the frictional contact region,
   wherein the wear protection layer is produced with at least two powdered additives during the laser cladding,
   wherein the at least two powdered additives enter the laser beam simultaneously,
   wherein a dwell time in the laser beam of each additive of the at least two additives is of different lengths,
   wherein each additive of the at least two additives is blown separately into the laser beam by at least one corresponding nozzle as a corresponding material jet, such that each of the additives enters the laser beam before reaching the base body,
   wherein all material jets of the at least two additives (i) meet at one meeting point in the laser beam, (ii) are mixed with one another at the one meeting point in the laser beam, and
   wherein the one meeting point is spaced apart from the base body, and
   wherein the at least two additives are blown into the laser beam at different angles relative to a longitudinal axis of the laser beam.

2. The method according to claim 1, wherein the at least two additives are blown into the laser beam (i) at equal or different radial distances from a longitudinal axis of the laser beam, and (ii) at equal or different axial heights relative to the base body.

3. The method according to claim 1, wherein the angles are selected such that each additive of the at least two additives is melted by the laser beam at the one meeting point.

4. The method according to claim 1, wherein each additive of the at least two additives is blown in from the at least one corresponding nozzle in a manner diametrically opposite relative to the laser beam.

5. The method according to claim 1, wherein:
   two groups are used as the at least two additives, and
   the two groups are alloys.

6. The method according to claim 1, wherein the friction brake body is a brake disc.

7. The method according to claim 1, wherein the angles are selected such that each additive of the at least two additives is melted by the laser as completely as possible.

8. The method according to claim 1, wherein the angles are selected such that each additive of the at least two additives is melted by the laser beam as incompletely as possible.

9. The method according to claim 1, wherein:
   two groups are used as the at least two additives,
   the two groups are iron-based alloys and hard materials, and
   the hard materials are compounds of one type including carbides, nitrides, or borides.

10. The method according to claim 1, wherein the one meeting point is a point located on a central longitudinal axis of the laser beam.

* * * * *